(12) United States Patent
Schmitt

(10) Patent No.: US 8,793,998 B2
(45) Date of Patent: Aug. 5, 2014

(54) TORQUE TRANSMISSION DEVICE

(75) Inventor: Marco Schmitt, Eichenzell/Rönshausen (DE)

(73) Assignee: Aktiebolaget SKF, Gothenburg (SE)

( * ) Notice: Subject to any disclaimer, the term of this patent is extended or adjusted under 35 U.S.C. 154(b) by 700 days.

(21) Appl. No.: 12/653,258

(22) Filed: Dec. 10, 2009

(65) Prior Publication Data
US 2010/0146964 A1   Jun. 17, 2010

(30) Foreign Application Priority Data
Dec. 11, 2008   (DE) .................... 20 2008 016 385 U

(51) Int. Cl.
*F02B 33/44* (2006.01)

(52) U.S. Cl.
USPC ........ 60/608; 123/559.1; 123/559.2; 123/561

(58) Field of Classification Search
USPC ............ 60/608; 123/559.1–559.3; 192/85.48, 192/110 B, 65, 48.2
See application file for complete search history.

(56) References Cited

U.S. PATENT DOCUMENTS

| | | | | |
|---|---|---|---|---|
| 4,387,794 A * | 6/1983 | Schneider et al. | .......... | 192/18 B |
| 5,109,964 A * | 5/1992 | Fukui et al. | ................ | 192/48.92 |
| 5,509,517 A * | 4/1996 | Berenson et al. | ................ | 192/65 |
| 6,257,386 B1 * | 7/2001 | Saito et al. | .................... | 192/48.2 |
| 8,196,725 B2 * | 6/2012 | Mohr et al. | .................... | 192/48.2 |
| 2003/0110772 A1 * | 6/2003 | Berglund | ........................ | 60/614 |
| 2004/0026203 A1 * | 2/2004 | Schneider et al. | .......... | 192/18 B |
| 2005/0143211 A1 * | 6/2005 | Yamamoto | .................... | 475/183 |
| 2006/0032225 A1 | 2/2006 | Dyne et al. | | |
| 2006/0191762 A1 * | 8/2006 | Joki | ................................ | 192/38 |
| 2006/0213743 A1 * | 9/2006 | Wolf | ............................. | 192/48.2 |
| 2008/0234101 A1 * | 9/2008 | Suzuki | ............................ | 477/97 |

FOREIGN PATENT DOCUMENTS

| | | | |
|---|---|---|---|
| DE | 2403450 | * | 8/1975 |
| DE | 4429855 C1 | | 8/1995 |
| DE | 10349164 A1 | | 5/2004 |
| EP | 1972820 A2 | | 9/2008 |
| FR | 2413580 A1 | | 7/1979 |
| GB | 950728 A | | 2/1964 |
| JP | 08277896 A | * | 10/1996 ............. F16H 13/10 |
| WO | WO2005083288 A1 | | 9/2005 |

OTHER PUBLICATIONS

JP-08-277896—Machine Translated on Nov. 20, 2012.*
DE-2403450—Machine Translated on Nov. 20, 2012.*

* cited by examiner

*Primary Examiner* — Thomas Denion
*Assistant Examiner* — Patrick Maines
(74) *Attorney, Agent, or Firm* — Bryan Peckjian; SKF USA Inc. Patent Department

(57) ABSTRACT

A torque transmission device includes a first shaft is coaxially borne relative to a second shaft via at least one roller bearing. An adjusting device adjusts the amount of torque transmitted from the first shaft to the second shaft by changing the internal bearing friction experienced by the at least one roller bearing. In one embodiment, the adjusting device causes one ring of the at least one roller bearing to axially displace relative to a second ring of the at least one roller bearing, thereby changing the amount of bearing friction experienced by roller bodies disposed between the first and second rings and thus the amount of torque transmitted from the first shaft to the second shaft.

15 Claims, 2 Drawing Sheets

TORQUE TRANSMISSION DEVICE

CROSS-REFERENCE

The present application claims priority to German utility model application no. 20 2008 016 385.4 filed on Dec. 11, 2008, the contents of which are incorporated fully herein by reference.

TECHNICAL FIELD

The invention generally relates to devices and methods capable of transmitting an adjustable or variable amount of torque from a first shaft to a second shaft, which devices and methods may be utilized, for example, in motor vehicle applications.

RELATED ART

Couplings for transmitting a drive torque from a first shaft to a second shaft are known, in which a roller bearing rotatably supports the first shaft relative to the second shaft. The torque transmission device can be, e.g., a fixed coupling (e.g., meshed gear wheels) or a disengageable clutch. When a rigid or fixed coupling of the two shafts should be avoided for design-engineering reasons, a hydraulic torque converter or a friction clutch, for example, can be utilized. In friction clutches in particular, an adjusting means changes the frictional torque and thus the amount of torque transmitted from the first shaft to the second shaft.

Further, it is known to convert at least a portion of the thermal losses in the exhaust gas from an internal combustion engine into kinetic energy in order to increase the effectiveness of and for reducing the losses of the internal combustion engine. The kinetic energy can be used, e.g., by an exhaust gas turbocharger for compressing intake air.

In addition to or in the alternate to a turbo charger turbine, it is also known to place an exhaust gas turbine in the exhaust gas system to generate useful energy and to transmit the torque from the exhaust gas turbine to a second shaft, which can be either the crankshaft of the internal combustion engine or the shaft of a load, e.g., the alternator or the air conditioning compressor. When the exhaust gas turbine is provided in addition to the turbo charger turbine, the internal combustion engine is called a turbo-compound engine.

It is problematic, however, when the rotational movement of the second shaft is not synchronous with the rotational movement of the exhaust gas turbine. For example, if the drive torque generated by the exhaust gas turbine will be transmitted to the crankshaft, sinusoidal fluctuations in the rotational speed of the crankshaft will be present at a frequency that corresponds to the frequency of the ignition (cylinder-firing) cycle, whereas the rotational speed of the exhaust gas turbine experiences no fluctuations or at most very small fluctuations at this frequency. When the two shafts have different torsional oscillations, i.e. cyclical fluctuations in their rotational speeds, a rigid coupling of the first shaft, which is connected with the exhaust gas turbine, with the crankshaft is not possible.

There is a long-felt need in the art to provide improved torque transmission devices and methods.

SUMMARY

In one aspect of the present teachings, robust torque transmission devices of the above-described type are disclosed that enable an effective coupling of two shafts that experience different torsional oscillations during operation.

In addition or in the alternative, the torque transmission devices may operate effectively and/or efficiently over a wide range of operational conditions.

In another aspect of the present teachings, a torque transmission device enables the transmission of a drive torque from a first shaft to a second shaft and preferably comprises at least one roller bearing that coaxially bears or supports the first shaft relative to the second shaft. An adjusting device or controller may be provided to adjust the amount of torque that is transmitted from the first shaft to the second shaft via the at least one roller bearing.

For example, in one non-limiting embodiment, the adjusting device or controller is preferably capable of varying an axial load or force acting on or applied to the roller bearing. For example, the torque transmitting device and/or the roller bearing may be constructed such that increases in the amount of the axial force applied to the roller bearing lead to an increased amount of torque being transmitted to the second shaft from the first shaft. By using a roller bearing for the transmission of torque in this aspect of the present teachings, very low oil consumption can be achieved in comparison to a hydraulic or hydrodynamic torque transmission device intended to perform the same torque transmission function. Since hydraulic or hydrodynamic torque converters are very sensitive to contamination in the oil, the robustness of the present torque transmission devices can be improved and the service life can be extended as compared to known torque converters.

Because roller bearing assemblies previously have been used in the art for avoiding or minimizing the transmission of torque between two shafts (i.e. by providing a very low sliding friction), the fact that a roller bearing according to the present teachings can be used as a coupling and/or as a mechanical torque converter is a surprising development.

Furthermore, whereas known hydraulic torque transmission devices are optimized for operation at one operating point, a torque transmission device constructed in accordance with one aspect of the present teachings is capable of achieving an effective, low-loss operation over a wide range of operational states. As a result, use of such a torque transmission device is also interesting in internal combustion engines that are designed to be operated over a wide rotational speed range and/or load range.

In another aspect of the present teachings, certain embodiments of the disclosed torque transmission devices are capable of reducing manufacturing costs and/or effectively using the energy, which is transmitted in a low-loss manner via the torque transmission device, over a wide spectrum of operational conditions.

In a presently preferred embodiment of the present teachings, the adjusting device or controller may comprise at least one pressure piston configured to act on a ring of the roller bearing, e.g., a piston may apply an axial force to one ring of a roller bearing that is rotatably supporting the first shaft relative to the second shaft. In such an embodiment, the axial force that is applied to the ring of the roller bearing can be adjusted in a precise and structurally-simple manner. The axially-oriented force can act either on the outer ring or on the inner ring of the roller bearing depending upon the construction of the torque transmission device.

In a preferred embodiment, the inner ring may be fixedly connected to or otherwise move in a fixed or proportional relationship with, e.g., a piston or other structural element that is movable with the pressure piston. In such an embodiment, the axial position of the outer ring is preferably fixed or at least substantially fixed, so that the inner ring is displaceable in the axial direction relative to the outer ring. Changes in the relative axial positions of the inner and outer rings preferably change a torque transmission coefficient of the torque transmission device. For example, the torque transmission device may be constructed such that a rearward displacement of the inner ring relative to the outer ring increases the internal bearing friction of roller bearing bodies disposed between the inner and outer rings, thereby increasing the amount of torque transmitted via the roller bearing from the first shaft to the second shaft.

In a further aspect of the present teachings, at least one roller bearing rotatably supporting the first shaft relative to the second shaft preferably has at least one inclined raceway. For example, the roller bearing(s) may be embodied as an inclined or angular contact bearing, e.g., as an angular contact ball bearing or an angular contact roller bearing. A roller bearing is understood as having an inclined raceway in the above-mentioned sense when a tangent directed perpendicular to the longitudinal direction of the raceway is inclined at an apex line of the raceway relative to the rotational axis of the roller bearing. The raceway can have, e.g., a logarithmic contact profile.

In embodiments in which the roller bearing is or comprises an angular contact bearing, a close relationship between the axial force acting on the roller bearing and the amount of bearing friction, which arises from the slipping or skidding of the roller bodies on the raceway(s), can be ensured. When the amount of bearing friction increases, the amount of torque transmitted from the input-side ring (e.g., the inner ring) of the roller bearing to an output-side ring (e.g., the outer ring) of the roller bearing preferably increases, which ultimately results in a transmission of torque via the roller bearing. Thus, in such an embodiment, a precise dependence of the transmitted torque on the axial force applied to the input-side ring of the roller bearing can be achieved.

In another embodiment, a particularly wear-resistant torque transmission device can be achieved when the at least one roller bearing is embodied as a toroidal bearing, i.e. when the raceway surface and/or the roller bodies have a profile that corresponds to a surface section of a toroid.

In another aspect of the present teachings, an automatic control of the torque transmission by the torque transmission device can be achieved by providing a control unit for operating or actuating the adjusting device or controller.

If, in preferred embodiments, the control unit is designed so as to analyze signals from at least one rotational speed sensor configured to measure the rotational speed of one of the shafts and to operate the adjusting device in accordance with the measured rotational speed, a feedback is possible, whereby a closed controlling circuit can be implemented.

In a further embodiment, the control unit may be designed so as to analyze signals from at least two rotational speed sensors configured to measure the rotational speed of the first shaft and the rotational speed of the second shaft, respectively. In this case, the amount of torque being transmitted can be assessed, e.g., by monitoring a difference in rotational speeds between the two shafts. In such an embodiment, the control unit can comprise, e.g., a comparator circuit or a circuit for determining the rotational speed difference between the two shafts.

In addition or in the alternative, the torque transmission device may preferably comprise a pressure sensor configured to measure the pressure in the compression chamber of the adjusting device or controller. In this embodiment, the pressure in the compression chamber, which is regulated by the control unit, can be monitored. Based upon the measured pressure, the pressure in the compression chamber can be adjusted to a target value by using a controlling circuit integrated and/or implemented in the control unit. The torque transmission device may be configured, e.g., such that increases in pressure in the compression chamber increase the axial force acting on the input-side ring of the roller bearing and vice versa.

If one of the shafts is formed as a hollow shaft and the other shaft is at least partially accommodated in an interior space thereof, a compact design that minimizes installation space is possible. In such an embodiment, designs are thus possible, in which the first input shaft is embodied as a hollow shaft and the second shaft is disposed in the interior space of the hollow shaft or vice versa.

In addition or in the alternative, the torque transmission device may be equipped with another bearing device that is configured to bear or rotatably support the hollow shaft in a housing in an axially-fixed manner, i.e. so that the hollow shaft does not displace along its axial direction. By fixing the hollow shaft in the axial direction, the axial force acting on the roller bearing can be applied in a constructively-simple manner via the shaft disposed in the interior space of the hollow shaft.

In an embodiment in which the pressure in the compression chamber acts on an axial end side of the shaft disposed in the interior space of the hollow shaft, an unconstrained transmission of force from the compression chamber to the roller bearing is achievable.

In a further preferred embodiment, a radial clearance between the first and second shafts, which may occur when no or a relatively small axial force is acting on the roller bearing that transmits torque from the first shaft to the second shaft, can be avoided or minimized by providing a second roller bearing that is configured to radially bear or support the hollow shaft (e.g., the first shaft) on the shaft accommodated in its interior space (e.g., the second shaft). In such an embodiment, a tilting of the two shafts relative to each other can be avoided, so that the rotational axes of the two shafts always remain co-linear. The second roller bearing may preferably comprise, e.g., a cylinder roller bearing.

Further advantages of the present teachings may be achieved by an apparatus that includes an internal combustion engine, an exhaust gas turbine and a torque transmission device of any of the above embodiments. For example, the exhaust gas turbine may be driven by exhaust gas from the internal combustion engine and may in turn drive (directly or indirectly) the first shaft of the one of the above-described torque transmission devices. The second shaft of the torque transmission device is preferably coupled to a crankshaft of the internal combustion engine or drives another load.

Because torque transmission devices according to at least some embodiments of the present teachings are usable over a wide range of operational conditions and in a flexible manner, the thermal energy in the exhaust gas can be effectively utilized, in particular when the internal combustion engine is operated over a wide range of rotational speeds at widely-differing loads. In this case, such torque transmission devices can be utilized in a surprising way with substantial benefits in internal combustion engines, e.g., for trucks, such that fuel savings, improved emissions values and a higher torque can be achieved without having to change the size of the engine.

The last-mentioned advantage of the higher torque can be achieved, for example, in embodiments in which the second shaft of the torque transmission device is a crankshaft of the internal combustion engine or is drivingly coupled with the crankshaft, e.g., via a transmission or other torque transmitting device.

In a further aspect of the present teachings, methods are disclosed for transmitting a drive torque from a first shaft to a second shaft, wherein the first shaft is coaxially borne or supported on the second shaft via a roller bearing. The method may generally involve changing the bearing friction of the roller bearing in order to change the amount of torque transmitted from the first shaft to the second shaft. The bearing friction may be changed, e.g., by axially displacing a first ring of the roller bearing relative to a second ring of the roller bearing, such that one or more roller bodies disposed therebetween are pressed more firmly against the respective raceways, thereby increasing the bearing friction. The axial displacement may be achieved by subjecting one of the rings of the roller body to a force or load (e.g., a pressure) in its axial direction while maintaining the position of the other ring in a fixed position along its axial direction.

As was already explained above, such methods are also characterized by very low oil consumption in comparison to a hydraulic or hydrodynamic torque transmission device, because a roller bearing is utilized to transmitting torque. Since hydraulic or hydrodynamic torque converters are very sensitive to contamination in the oil, the robustness of a torque transmitting device can also be improved and the service life can be extended. Also, cost-savings may be realizable thereby.

Further advantages, objects and features of the present teachings will be readily derivable by a skilled person from the following detailed description of the figures and from the appended claims.

DETAILED DESCRIPTION OF THE PREFERRED EMBODIMENTS

Each of the additional features and teachings disclosed below may be utilized separately or in conjunction with other features and teachings to provide improved torque transmission devices, as well as methods for designing, constructing and using the same. Representative examples of the present invention, which examples utilize many of these additional features and teachings both separately and in combination, will now be described in further detail with reference to the attached drawings. This detailed description is merely intended to teach a person of skill in the art further details for practicing preferred aspects of the present teachings and is not intended to limit the scope of the invention. Therefore, combinations of features and steps disclosed in the following detail description may not be necessary to practice the invention in the broadest sense, and are instead taught merely to particularly describe representative examples of the present teachings.

Moreover, the various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter.

Figure 1:
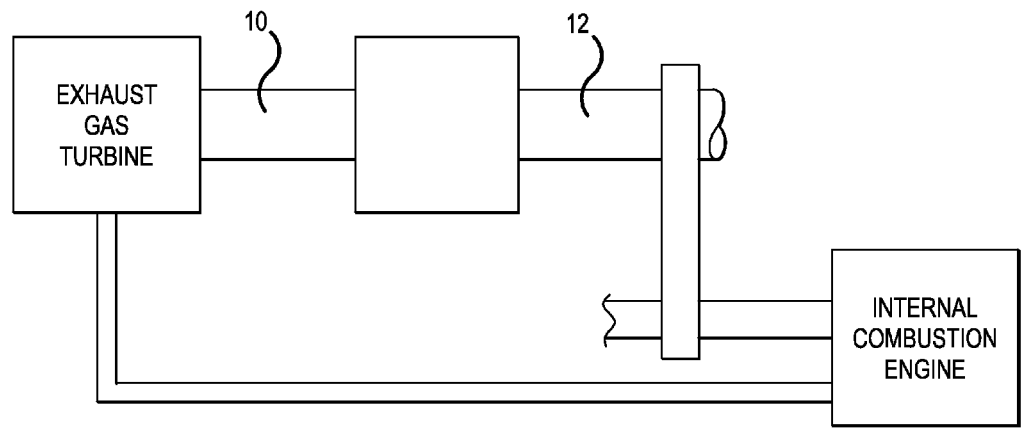
FIG. 1 shows a schematic illustration of a representative, but not limiting, torque transmission device for transmitting a drive torque from a first shaft to a second shaft.

FIG. 1 shows a representative, but non-limiting, torque transmission device and/or a coupling for transmitting a drive torque from a first shaft 10 to a second shaft 12. The torque transmission device enables the two shafts 10, 12 to be coupled even when the rotational speeds of the two shafts 10, 12 are subjected to different torsional oscillations and/or cyclical torque fluctuations.

Figure 2:
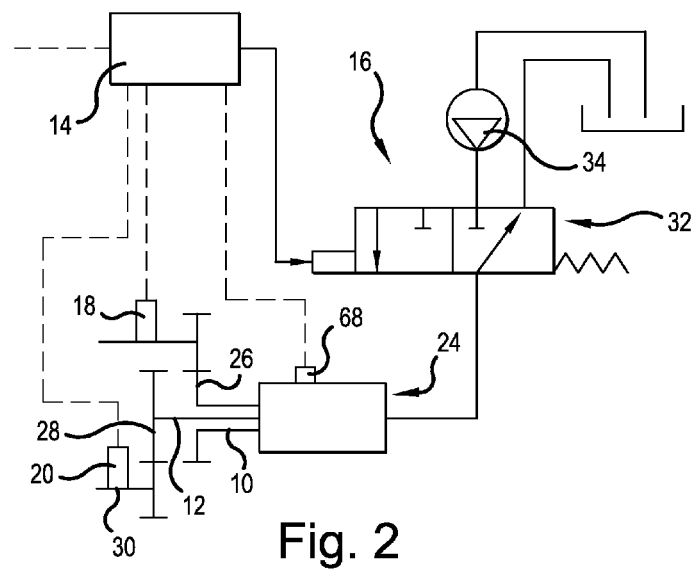
FIG. 2 shows the torque transmission device of FIG. 1 with a control unit and a pressure generating system.

FIG. 2 shows the torque transmission device of FIG. 1 with a control unit 14 and a pressure generating system 16, sometimes referred to herein as a "pressure generator". The torque transmission device preferably comprises two rotational speed sensors 18, 20, whose signals can be respectively read-out by the control unit 14 via respective signal lines. The control unit 14 is programmed to read out and process the signals from the rotational speed sensors 18, 20. The signals from the two rotational speed sensors 18, 20 are analyzed to measure the rotational speed of the first shaft 10 and the rotational speed of the second shaft 12. For this purpose, a characteristic curve and/or characteristic map may be stored in a not-illustrated memory unit of the control unit 14, which curve and/or map preferably specifies, for given pressures existing in a compression chamber 22 of an adjusting device 24 illustrated in FIGS. 2 and 3, the control pressure for adjusting the amount of torque transmitted from the first shaft 10 to the second shaft 12 in accordance with the measured rotational speeds and/or the rotational speed differences.

The torque transmission unit is preferably a part of an internal combustion engine of a truck or other motor vehicle, although the present teachings are not limited thereto. The first shaft 10 preferably may be coupled via a gear wheel 26 to an exhaust gas turbine of an exhaust gas system of the internal combustion engine. The second shaft 12 is preferably coupled via a second gear wheel 28 to a crankshaft 30 of the internal combustion engine. The transmission ratio(s) set by the first gear wheel 26 and the second gear wheel 28 is/are preferably selected such that the rotational speed of the first shaft 10 is higher than the rotational speed of the second shaft 12, in particular for the maximum rotational speed of the internal combustion engine and/or the crankshaft 30.

The control unit 14 is preferably a part of the engine control unit of the internal combustion engine and may be configured to set or adjust the pressure in the compression chamber 22 in accordance with the rotational speed of the first shaft 10 and the second shaft 12 and/or in accordance with the load torque of the internal combustion engine and/or in accordance with other engine parameters, such as the airflow rate, the injected fuel amount, various temperatures, etc. that are available via a CAN-bus.

The compression chamber 22 may be filled with hydraulic oil that is fed in by a pump 34 via an electromagnetic control valve 32. The control unit 14 controls an actuator of the control valve 32 via a control line.

Figure 3:
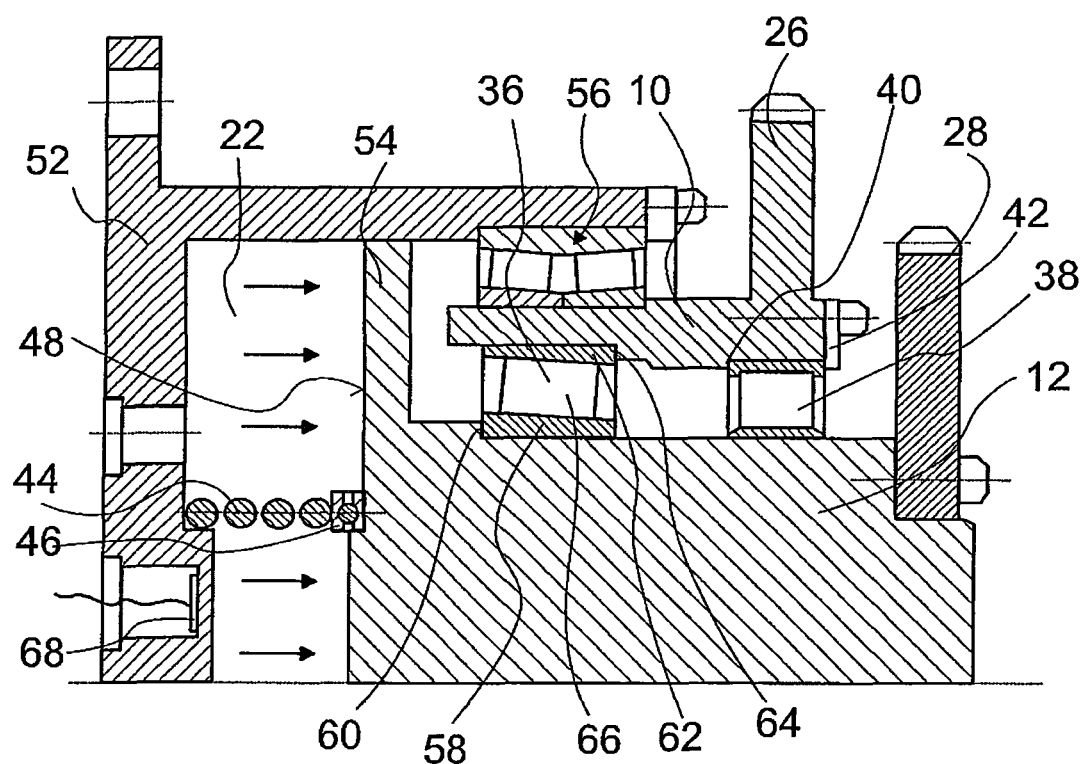
FIG. 3 shows the torque transmission device of FIGS. 1 and 2 in a cross-sectional illustration.

FIG. 3 shows the torque transmission device of FIGS. 1 and 2 in a cross-sectional illustration. The torque transmission device comprises two roller bearings 36, 38 for coaxially bearing or rotationally supporting the first shaft 10 relative to the second shaft 12 as well the adjusting device or controller 24, which serves to adjust the amount of torque transmitted from the first shaft 10 to the second shaft 12. In the present embodiment, a first roller bearing 36 is designed to transmit torque between the first shaft 10 and the second shaft 12 and a second roller bearing 38 provides supplemental radial support for the first shaft 10 on the second shaft 12.

The second roller bearing 38 is preferably formed as a radial-cylinder roller bearing and is installed with its inner ring being axially movable on or along the second shaft 12, whereas the outer ring of the second roller bearing 38 is accommodated in a recess defined in the profile of the first shaft 10, which is formed as a hollow shaft. Preferably, a collar 40 defined in the first shaft 10 and a retaining element 42 attached thereto retain the roller bearing 38 so that it can not move in the radial or axial directions.

In the present, non-limiting preferred embodiment, the adjusting device or controller 24 is configured to vary the axial load acting on or applied to an inner (input-side) ring 58 of the first roller bearing 36. The adjusting device 24 may comprise or operate in conjunction with one or more of the compression chamber 22, the pressure generating system 16, which includes the pump 34 and the control valve 32, and a spring 44 disposed in the compression chamber 22. The spring 44 is supported on one side on a housing 52 of the torque transmission device and on the other side it abuts on an end side 48 of the second shaft 12 via a thrust ball bearing 46. The end side 48 of the second shaft 12 forms a displaceable wall of the compression chamber 22 and the second shaft 12 is itself borne in an axially-displaceable manner in a bore of the housing 52. The walls of the housing 52 form the remaining interior walls of the compression chamber 22. In this design, the second shaft 12 functions as an axially-displaceable piston and/or pressure piston 54 disposed in the compression chamber 22.

The first shaft 10 is formed as a hollow shaft and accommodates the second shaft 12 in an interior space thereof. Another bearing device 56 bears or supports the hollow first shaft 10 in the housing 52 in axially- and radially-fixed manner, i.e. so that the first shaft 10 does not move relative to the housing 52 in the axial or radial directions of the first shaft 10. The bearing device 56 preferably comprises two inclined toroidal-roller bearings having mutually-opposing chamfers.

The inner ring 58 of the first roller bearing 36 abuts on a step or shoulder 60 defined in the profile of the second shaft 12. Consequently, when a pressure force acts on the end side 48 of the second shaft 12 in the axial direction, the force is applied or transmitted to the inner ring 58 via the step 60. The adjusting device 24 also preferably comprises a pressure piston 54 (e.g., an axial end of the second shaft 12) that acts on or contacts the inner ring 58 of the roller bearing 36. In general, it sufficient to apply an axially-directed force to the inner ring 58 using any suitable force-generating device.

The outer (output-side) ring 62 of the first roller bearing 36 is supported on the opposite side in the direction, in which the pressure in the compression chamber 22 acts, by another step or shoulder 64 defined in the inner profile of the hollow first shaft 10. Consequently, the pressure forces transmitted via the roller bodies 66 from the inner ring 58 to the outer ring 62 of the first roller bearing 36 are applied via the other step 64 to the first shaft 10.

In the exemplary embodiment illustrated in FIG. 3, the roller bearing 36 is formed as a toroidal bearing with inclined raceways, so that the diameter of the slightly curved, conical raceways narrows in the direction of the common rotational axes of the two shafts 10, 12. Therefore, when the axial force is applied to the inner ring 58 and this force is transmitted via the roller bodies 66, a relatively large radial force component is generated due to the inclination of the raceways in the axial direction. This radial force component causes the roller bodies 66 to be pressed against the raceways in direct correspondence to the amount of axial force applied to the inner ring 58.

When sufficient axial force is applied, the roller bodies 66 ride on the raceways of the inner ring 58 and the outer ring 62 with a slippage due to the diameter of the raceways, which decreases in the axial direction, and due to the nearly cylindrical shape of the roller bodies 66. As the force increases, which presses the roller bodies 66 against the raceways, the frictional torque generated thereby increases. Therefore, the amount of frictional torque experienced by the first roller bearing 36 and thus the amount of torque transmitted via the roller bearing 36 from the first shaft 10 to the second shaft 12 can be adjusted by changing the pressure in the compression chamber 22, which changes the internal bearing friction of the roller bearing 36. For example, a relatively low pressure in the compression chamber 22 results in a relatively low torque transmission coefficient and a relatively high pressure results in a relatively high torque transmission coefficient.

The torque transmission device also may preferably comprise a pressure sensor 68 configured to measure or detect the pressure in the compression chamber 22. The control unit 14 reads out signals from the pressure sensor 68 in order to measure the pressure in the compression chamber 22 and compares the measured pressure with a target value. Based upon the difference between the measured pressure and the target value of the pressure in the compression chamber 22, the control unit 14 regulates the pressure in the compression chamber 22 to the target value.

In another embodiment, the torque transmission device illustrated in FIGS. 1-3 may be a part of an internal combustion engine that includes an exhaust gas turbine, which drives the first shaft 10 of the torque transmission device via its turbine shaft. The second shaft 12 is preferably coupled, e.g., via the gear wheel 28 with a crankshaft 30 of the internal combustion engine and transmits the torque to the crankshaft 30. Thus, as was mentioned above, such an embodiment is capable of utilizing energy from the exhaust gas to boost the torque experienced by the crankshaft 30, thereby resulting in improved fuel efficiency and higher output torque.

A method for transmitting a drive torque from a first shaft 10 to a second shaft 12 that are coaxially borne via a roller bearing 36 may be performed, e.g., using the above-described representative torque transmission device, although the present methods are not limited to the presently preferred embodiment. According to a preferred method, an axial load acting on or applied to the roller bearing 36 is varied to adjust the amount of torque transmitted from the first shaft 10 to the second shaft 12.

The present teachings are not limited to the above-described exemplary embodiments and may be modified in various ways.

For example, instead of the toroid bearing, one or two angular contact bearing(s) or angular roller bearing(s) and/or angular conical bearing(s) could also be used to rotatably bear the first shaft on the second shaft. In general, any roller bearings configured to change or vary an internal bearing friction when subjected to an input force or other controlled input are suitable for use with the present teachings. Roller bearings which have at least one inclined raceway and one ring that is axially displaceable relative to the other ring are particularly preferred, but the present teachings are not limited thereto.

Furthermore, the configuration of the adjusting device or controller 24 is not particularly limited. Any device or apparatus capable of adjusting the amount of force acting on the roller bearing 36 in the axial direction of the shafts 10, 12 and/or changing the amount of internal bearing friction experienced by the roller bearing 36 can be used without limitation in the present teachings. Other devices may include hydraulic devices, actuators, etc. that do not utilize changes in pressure acting on an axial end of the roller bearing 36, but rather directly apply an axially-directed force to a ring of the roller bearing 36.

Moreover, the present torque transmitting devices are not limited to usage in the motor vehicle field, but will find application in any field where it is desired to transmit a variable amount of torque from a first shaft to a second shaft.

The control unit 14 may be embodied, e.g., as a programmable microprocessor or as a dedicated analog and/or digital circuit.

REFERENCE NUMBER LIST

10 Shaft
12 Shaft
14 Control Unit
16 Pressure generating system
18 Rotational speed sensor
20 Rotational speed sensor
22 Compression chamber
24 Adjusting device
26 Gear wheel
28 Gear wheel
30 Crankshaft
32 Control valve
34 Pump
36 Roller bearing
38 Roller bearing
40 Collar
42 Retaining element
44 Spring
46 Thrust ball bearing
48 End side
52 Housing
54 Pressure Piston
56 Bearing device
58 Inner ring
60 Step
62 Outer ring
64 Step
66 Roller bodies
68 Pressure Sensor

The invention claimed is:

1. A torque transmission device comprising:
a first shaft and a second shaft,
at least one roller bearing coaxially bearing the first shaft relative to the second shaft, and
an adjusting device configured to vary an axial pressure force acting on the at least one roller bearing so as to adjust an amount of torque transmitted from the first shaft to the second shaft,
wherein the at least one roller bearing comprises one of a toroidal bearing and an angular contact bearing,
and the torque transmission device further comprises:
a pressure sensor configured to measure a pressure in a compression chamber of the adjusting device, and
a controller configured to analyze a signal from the pressure sensor and to generate a corresponding signal for applying the axial pressure force to the at least one roller bearing.

2. A torque transmission device according to claim 1, wherein the adjusting device comprises at least one pressure piston movably disposed in a compression chamber, the at least one pressure piston directly or indirectly applying the axial pressure force to a ring of the at least one roller bearing.

3. A torque transmission device according to claim 1, wherein the at least one roller bearing has at least one inclined raceway.

4. A torque transmission device according to claim 1, further comprising:
at least one rotational speed sensor configured to detect a rotational speed of one of the shafts, and
wherein the controller is further configured to analyze a signal from the at least one rotational speed sensor in order to measure the rotational speed of one of the shafts and to operate the adjusting device in accordance with the measured rotational speed.

5. A torque transmission device according to claim 1, further comprising:
a first rotational speed sensor configured to detect a rotational speed of the first shaft,
a second rotational speed sensor configured to detect a rotational speed of the second shaft, and
wherein the control unit is further configured to analyze signals from the first and second rotational speed sensors in order to measure the respective rotational speeds of the first and second shafts and to operate the adjusting device in accordance with the measured rotational speeds.

6. A torque transmission device according to claim 1, wherein the first shaft is a hollow shaft and the second shaft is at least partially accommodated in an interior space of the first shaft, the at least one roller bearing being disposed between the first and second shafts.

7. A torque transmission device according to claim 6, further comprising a housing and a further bearing device configured to rotatably support the first shaft in the housing in an axially-fixed manner.

8. A torque transmission device according to claim 7, wherein:
the at least one roller bearing has at least one inclined raceway and a first ring coupled to the second shaft is axially displaceable relative to a second ring coupled to the first shaft,
the second shaft is axially displaceable relative to the first shaft, and
the adjusting device comprises:
a compression chamber, wherein an axial end of the second shaft defines a displaceable wall of the compression chamber,
a pressure generator configured to induce a varying pressure in the compression chamber so as to vary a force acting on the axial end of the second shaft,
a pressure sensor configured to measure the pressure in the compression chamber and
wherein the controller is further configured to analyze a signal from the pressure sensor and to generate a corresponding signal that adjusts the pressure in the compression chamber and thereby adjusts the force applied to the first ring in the axial direction.

9. An apparatus comprising:
an exhaust gas turbine, and
a torque transmission device including a first shaft and a second shaft, at least one roller bearing coaxially bearing the first shaft relative to the second shaft, and an adjusting device configured to vary an axial pressure force acting on the at least one roller bearing so as to adjust an amount of torque transmitted from the first shaft to the second shaft, wherein the exhaust gas turbine directly or indirectly drives the first shaft of the torque transmission device, wherein the at least one roller bearing comprises one of a toroidal bearing and an angular contact bearing, wherein the first shaft has a first axis of rotation and wherein the apparatus includes a housing having an interior;

wherein the second shaft has a second axis of rotation parallel to the first axis of rotation and includes a piston wall perpendicular to the second axis of rotation, the piston wall being located in the interior of the housing, wherein the at least one roller bearing includes a first ring connected to the first shaft and a second ring connected to the second shaft, the at least one roller bearing being configured such that a torque transmitted from the first shaft and the second shaft increases when the second shaft moves in a first axial direction relative to the first shaft;

the apparatus including a pressure chamber defined by a wall of the housing and by the piston wall, the piston wall being movable along the second axis relative to the first shaft;

the apparatus including a pump for controlling fluid pressure in the pressure chamber; and wherein the adjusting device comprises a controller for controlling the pump and moving the piston wall by controlling the fluid pressure to change the axial position of the second shaft relative to the first shaft.

10. An apparatus according to claim 9, further comprising an internal combustion engine having a crankshaft, wherein exhaust gas from the internal combustion engine drives the exhaust gas turbine and the second shaft of the torque transmission device is directly or indirectly coupled with the crankshaft such that drive torque from the first shaft is transmitted to the crankshaft.

11. A torque transmission device comprising:
a housing having an interior;
a first shaft having a first axis of rotation, the first shaft projecting into the interior;
a second shaft having a second axis of rotation and having a piston wall perpendicular to the second axis of rotation, the piston wall being located in the interior of the housing;
at least one roller bearing coaxially bearing the first shaft relative to the second shaft, the at least one roller bearing including a first ring connected to the first shaft and a second ring connected to the second shaft, the at least one roller bearing being configured such that a torque transmitted from the first shaft and the second shaft increases when the second shaft moves in a first axial direction relative to the first shaft;
a pressure chamber defined by a wall of the housing and by the piston wall, the piston wall being movable along the second axis relative to the first shaft;
a pump for controlling a fluid pressure in the pressure chamber; and
a controller for controlling the pump and moving the piston wall by controlling the fluid pressure to change the axial position of the piston wall relative to the wall of the housing.

12. A torque transmission device according to claim 11, including a spring in the pressure chamber biasing the piston wall in the first axial direction.

13. A torque transmission device according to claim 11, further comprising:
a first rotational speed sensor configured to detect a rotational speed of the first shaft, and
a second rotational speed sensor configured to detect a rotational speed of the second shaft,
wherein the controller is configured to analyze signals from the first and second rotational speed sensors in order to determine the rotational speed of the first shaft and the rotational speed of the second shaft and to control the pump in accordance with the measured rotational speeds.

14. A torque transmission device according to claim 11, wherein the piston wall is slidingly supported by the wall of the housing.

15. The torque transmission device according to claim 11, wherein the pressure chamber is defined in part by an end of the second shaft.

* * * * *